(12) United States Patent
Fujii et al.

(10) Patent No.: US 6,425,285 B1
(45) Date of Patent: Jul. 30, 2002

(54) DRIVE UNIT

(75) Inventors: Nobuyoshi Fujii; Satoshi Ueda, both of Kure; Futoshi Doi, Kawasaki, all of (JP)

(73) Assignee: Mitutoyo Corporation, Kawasaki (JP)

( * ) Notice: Subject to any disclaimer, the term of this patent is extended or adjusted under 35 U.S.C. 154(b) by 34 days.

(21) Appl. No.: 09/695,851

(22) Filed: Oct. 26, 2000

(30) Foreign Application Priority Data

Nov. 1, 1999 (JP) ............................................. 11-310939

(51) Int. Cl.$^7$ ............................ G01B 7/34; G01B 21/30
(52) U.S. Cl. ............................ 73/104; 73/105; 33/558; 33/558.4
(58) Field of Search ..................... 73/104, 105; 33/556, 33/558, 558.01, 558.3, 558.4, 559, 561

(56) References Cited

U.S. PATENT DOCUMENTS 4,765,181 A   8/1988  Numoto et al. ............... 73/105

FOREIGN PATENT DOCUMENTS

JP            11-190607        7/1999  ................... 73/105

*Primary Examiner*—Daniel S. Larkin
(74) *Attorney, Agent, or Firm*—Oliff & Berrige PLC

(57) ABSTRACT

A slider holding a measuring tool moves along an approximately reverse U-shaped guide rail provided in parallel with a moving direction of the measuring tool without being rotated. Accordingly, a cross section of the guide rail can be enlarged without increasing the size of the entirety of a drive unit. As a result, high rigidity can be obtained while reducing the size and weight of the drive unit as compared to a conventional arrangement having two shafts. Further, linearity of the slider and the measuring tool moving along a reference surface of the guide rail can be attained with high accuracy. Further, since a pre-load means for biasing the slider toward a guide rail is provided, a position or orientation of the slider and the measuring tool can be stabilized, thus securely repeating movement of the measuring tool.

6 Claims, 5 Drawing Sheets

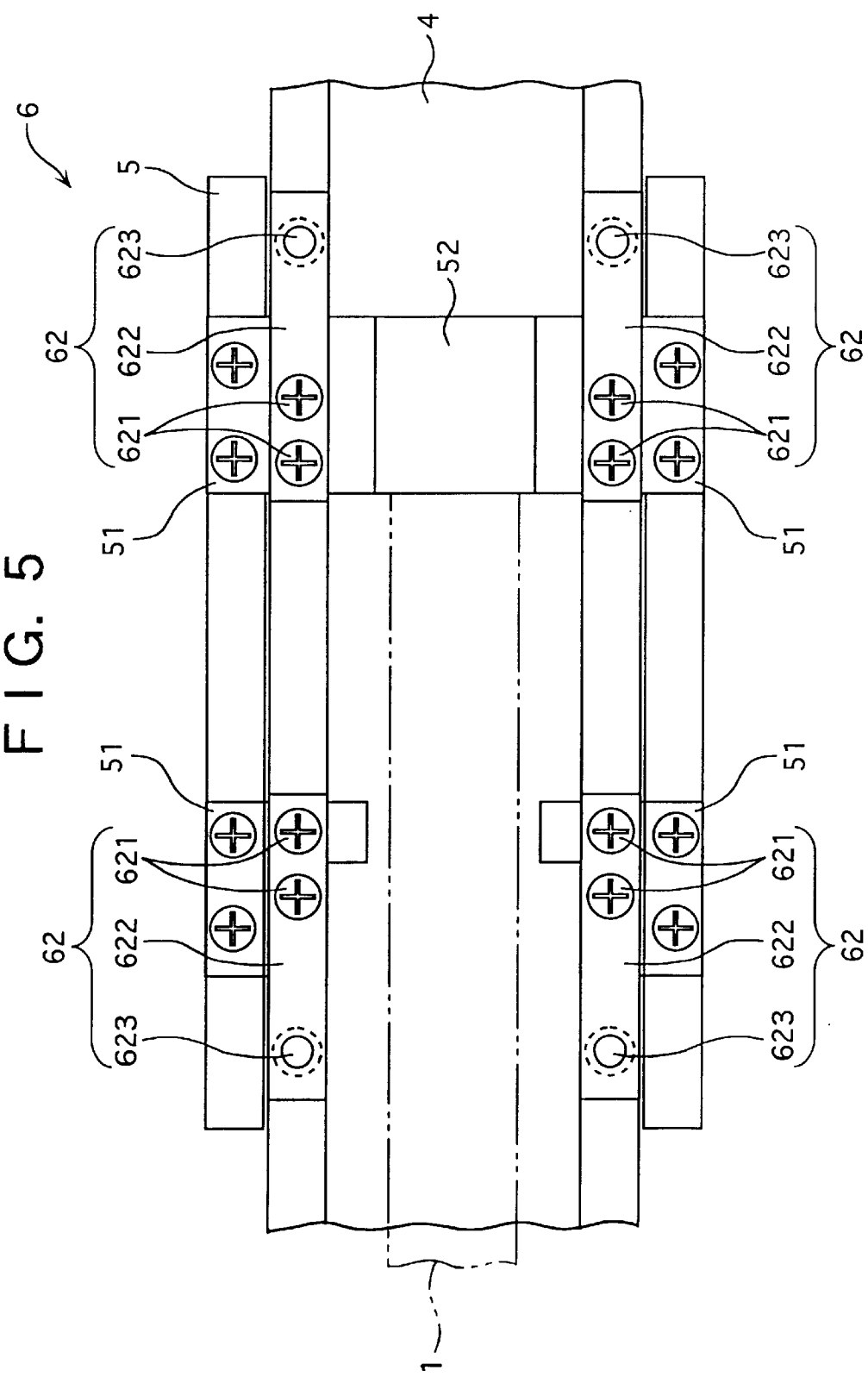

DRIVE UNIT

BACKGROUND OF THE INVENTION

1. Field of the Invention

The present invention relates to a drive unit. More specifically, it relates to a drive unit capable of moving a measuring tool for measuring surface texture of a workpiece such as surface roughness, waviness, and form along a surface of the workpiece.

2. Description of Related Art

An example of a drive unit capable of moving a measuring tool for measuring surface roughness, waviness, form etc. of a workpiece along the surface of the workpiece is known in U.S. Pat. No. 4765181 (related art 1).

The drive unit has a box-shaped frame, a sliding shaft provided in the frame in parallel with a moving direction of the measuring tool and holding the measuring tool, and a driver for moving the sliding shaft along an axial direction thereof. Both ends of the sliding shaft are supported by roller bearings in a sliding manner in the axial direction.

Since the sliding shaft of the drive unit is formed of a small diameter rod, flexure, for example, can be generated to the sliding shaft, thus impairing straightness of the sliding shaft. Accordingly, the linearity of the measuring tool secured to the sliding shaft can be impaired. Further, since the measuring tool is moved by displacing the sliding shaft in the axial direction thereof, the size of the frame has to be increased by the length of the sliding shaft itself and moving distance thereof, so that the moving distance of the measuring tool can be decreased relative to the length of the driving unit itself.

In order to overcome the above deficiencies, another drive unit disclosed in Japanese Patent Application No. Hei 11-190607 has been proposed (related art 2).

The drive unit has a box-shaped frame, a main shaft and a sub-shaft fixed to the frame, a slider slidably provided to the main shaft for holding the measuring tool and engaging to the sub-shaft, and a driver for moving the slider along the main shaft.

The driver does not move a rod member, such as the sliding shaft, as in the above-described related art 1 in the moving direction of the measuring tool, but moves the slider along the main shaft and the sub-shaft fixed to the frame, so that the slider (i.e. measuring tool) can be moved by the length of the shaft, thus increasing the moving distance of the measuring tool as compared to the driver of the related art 1. Accordingly, for achieving the same moving distance, the size of the related art 2 can be reduced when comparing the drive unit of the related art 1 with the related art 2.

However, since the drive unit of the related art 2 is arranged to move the slider holding the measuring tool along the main shaft while being engaged to the sub-shaft so that the slider does not rotate relative to the main shaft, structure thereof can be complicated on account of the need for providing the sub-shaft for preventing rotation of the slider relative to the main shaft, and the size and weight thereof can be increased.

Further, since the driver of the drive units of the related arts 1 and 2 is composed of a motor and a feeding threaded shaft provided serially relative to the shaft of the motor, the moving distance of the measuring tool (i.e. the length of the feeding threaded shaft) cannot be lengthened as compared to the size of the drive unit (total length of the motor and the feeding threaded shaft). In other words, for increasing the moving distance of the measuring tool, the size of the drive unit itself has to be increased.

SUMMARY OF THE INVENTION

An object of the present invention is to provide a drive unit capable of maintaining linearity of the moving direction of the measuring tool with a simple structure and capable of reducing size and weight thereof.

A drive unit according to the present invention is for moving a measuring tool along a surface of a workpiece. The drive unit is characterized in having: a frame; a guide rail provided to the frame, the guide rail having at least two reference surfaces in parallel with a moving direction of the measuring tool, the reference surfaces mutually crossing at a predetermined angle; a slider slidable along the reference surfaces of the guide rail, the slide holding the measuring tool; a pre-load means for biasing the slider toward the reference surfaces of the guide rail; and a driver for moving the slider along the guide rail.

According to the present invention, the slider holding the measuring tool is moved without being rotated along a single guide rail having at least two reference surfaces parallel with the moving direction of the measuring tool, the reference surfaces retaining a predetermined angle with each other. Accordingly, since the cross section of the guide rail can be enlarged without increasing the size of the entire drive unit, the size and weight of the drive unit can be reduced while securing high rigidity as compared to a conventional arrangement having the two shafts. Therefore, the linearity of the moving direction of the slider and the measuring tool being moved along the reference surfaces of the guide rail can be achieved with high accuracy.

Further, since the slider is always biased by the pre-load means toward the reference surfaces of the guide rail, the position of the slider can be maintained constant even when a clearance is formed between the slider and the guide rail. Accordingly, the position or orientation of the slider (i.e. the measuring tool) does not become unstable on account of the clearance of the sliding portion, and the movement of the measuring tool can be securely repeated.

In the present invention, the guide rail may preferably be formed in an approximately reverse U-shape and the slider is formed in an approximately reverse U-shape corresponding to the configuration of the guide rail.

According to the present invention, since the guide rail and the slider are formed in an approximately reverse U-shape, the weight of the guide rail and the slider can be reduced while maintaining high rigidity.

In the present invention, the pre-load means may preferably have a first pre-load means for biasing the slider to one of the reference surfaces of the guide rail and a second pre-load means for biasing the slider to the other one of the reference surfaces of the guide rail.

According to the present invention, since the first and the second pre-load means biasing the slider to the reference surfaces of the guide rail are provided to the approximately reverse U-shaped guide rail and slider, the slider can be biased toward the respective reference surfaces of the guide rail at an appropriate force. Further, when the two reference surfaces respectively extend perpendicularly and horizontally, the slider may preferably be biased toward the guide rail at relatively high pressure on the perpendicular reference surface and the slider may preferably be biased toward the guide rail at relatively low pressure on the horizontal reference surface considering gravity (weight) of the slider, so that the slider is biased toward the respective reference surfaces of the guide rail at an appropriate force. Therefore, slidability and linearity of the slider can be simultaneously attained.

According to the above arrangement, since the leaf spring fixed to the slider presses the slide pieces toward the guide rail for biasing the slider toward the guide rail, the slider can be securely biased to the guide rail with a simply-structured pre-load means.

Further, by using material having a small friction coefficient, such as TEFLON (trade name, i.e., polytetraflouroethylene), for the slide piece, no great friction force is caused between the guide rail and abutting surfaces of the slide piece even when the slider is biased toward the guide rail by the first and the second pre-load means, so that the slider can be smoothly slid along the guide rail.

According to the above arrangement, the motor is rotated and the rotation force of the motor is transmitted to the feeding threaded shaft through the connecting mechanism, so that the feed piece screwed to the feeding threaded shaft is advanced and retreated, thus moving the slider and the measuring tool. In the driver, since the shaft of the motor and the feeding threaded shaft are parallel, the feeding threaded shaft can be extended over the maximum available longitudinal length of the drive unit, thus securing a longer moving distance of the measuring tool than in the conventional arrangement. In other words, when the moving distance of the measuring tool is equal to the length of the feeding threaded shaft, the size of the drive unit itself can be reduced as compared to the conventional drive unit.

In the present invention, both ends of the guide rail may preferably be integrally fixed to both ends of the frame.

According to the present invention, since both ends of the guide rail are integrally fixed to frame, the size of the guide rail can be increased relative to the size of the drive unit, thus further enhancing the rigidity of the frame. Therefore, when the drive unit itself is supported by a cantilever construction, since the frame and the guide rail do not distort, the linearity of the moving direction of the measuring tool can be maintained.

BRIEF DESCRIPTION OF THE DRAWINGS

FIG. 5 is a plan view showing another primary portion (second pre-load means) of the aforesaid embodiment.

DETAILED DESCRIPTION OF PREFERRED EMBODIMENT(S)

A preferred embodiment of the present invention will be described below with reference to attached drawings.

Figure 1:
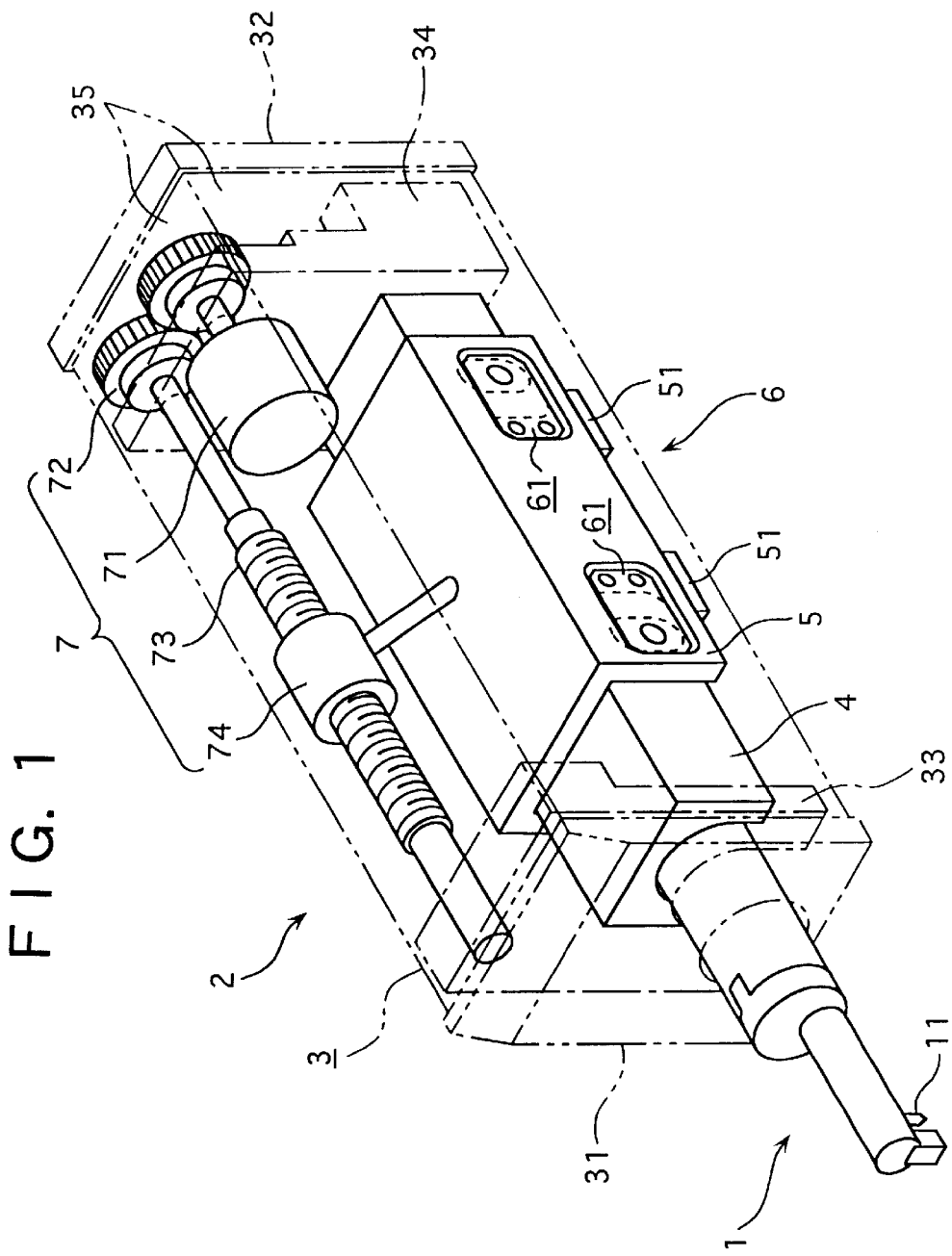
FIG. 1 is an entire perspective view showing an embodiment of a drive unit according to the present invention.

FIG. 1 shows a drive unit 2 holding a measuring tool 1 for measuring surface roughness, waviness, and form of a workpiece. The measuring tool 1 has a stylus 11 to be in contact with a surface of a workpiece, the stylus 11 detecting the surface roughness etc. based on vertical displacement thereof.

The drive unit 2 has a box-shaped frame 3, a guide rail 4 provided to the frame 3 and extending in parallel with the moving direction of the measuring tool 1, a slider 5 slidable along the guide rail 4 and holding the measuring tool 1, a pre-load means 6 for biasing the slider 5 toward the guide rail 4, and a driver 7 for moving the slider 5 along the guide rail 4.

The frame 3 has a front guide 31 disposed on a front side (leftward in the figure), a rear guide 32 disposed opposite to the front guide 31, a front frame 33, and a rear frame 34, respectively attached to opposing sides of the front guide 31 and the rear guide 32, and a cylindrical frame cover extending between the front guide 31 and the rear guide 32.

Figure 2:
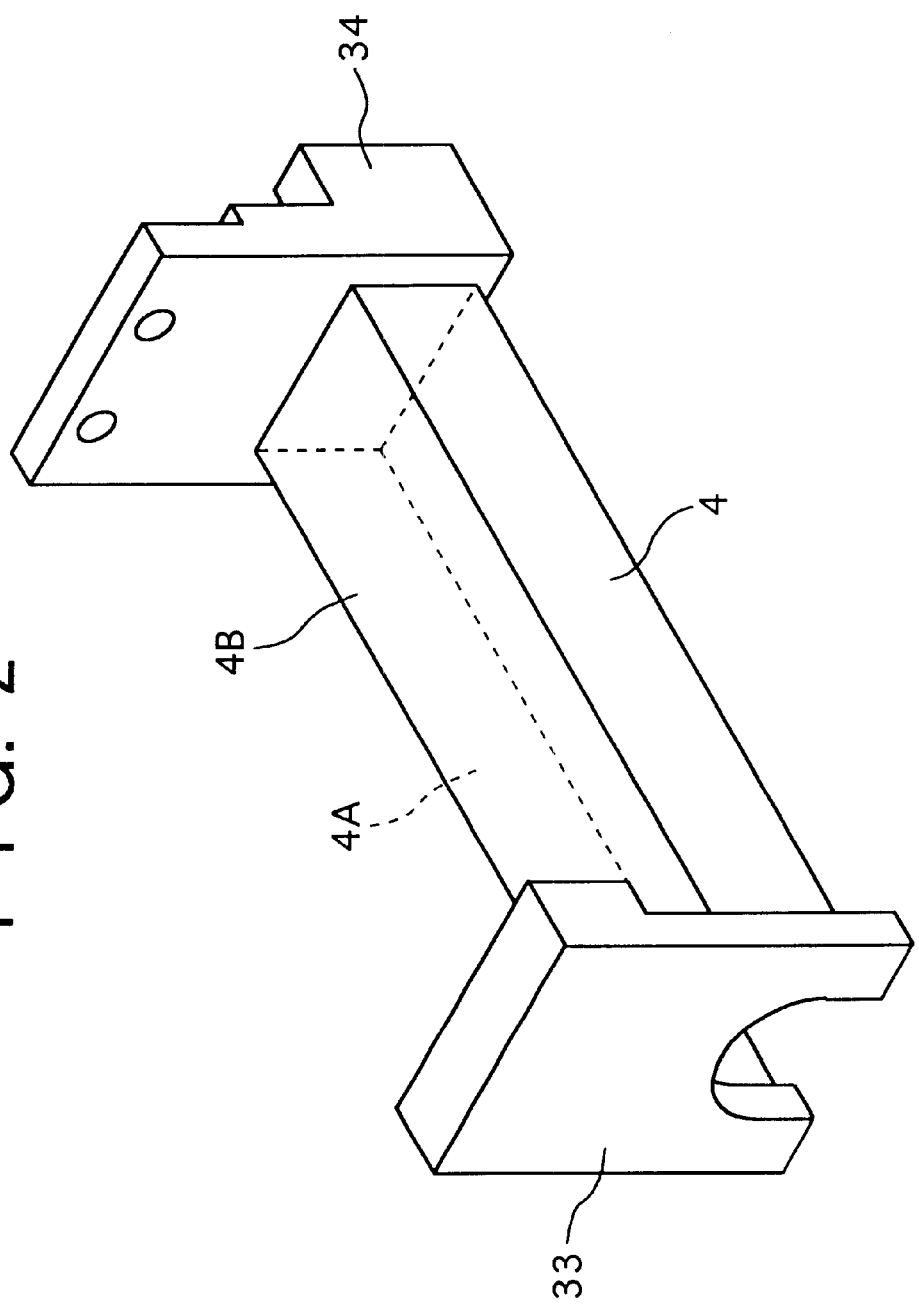
FIG. 2 is a perspective view showing a guide rail used in the aforesaid embodiment.

The guide rail 4 is formed in an approximately reverse U-shape opening downward and has a perpendicular first reference surface 4A and a horizontal second reference surface 4B mutually crossing at a predetermined angle (90°), as shown in FIG. 2. Incidentally, corners within the guide rail 4 are rounded, thus enhancing rigidity of the guide rail 4. Further, both ends of the guide rail 4 are integrally fixed to the front frame 33 and the rear frame 34 of the frame 3.

Figure 3:
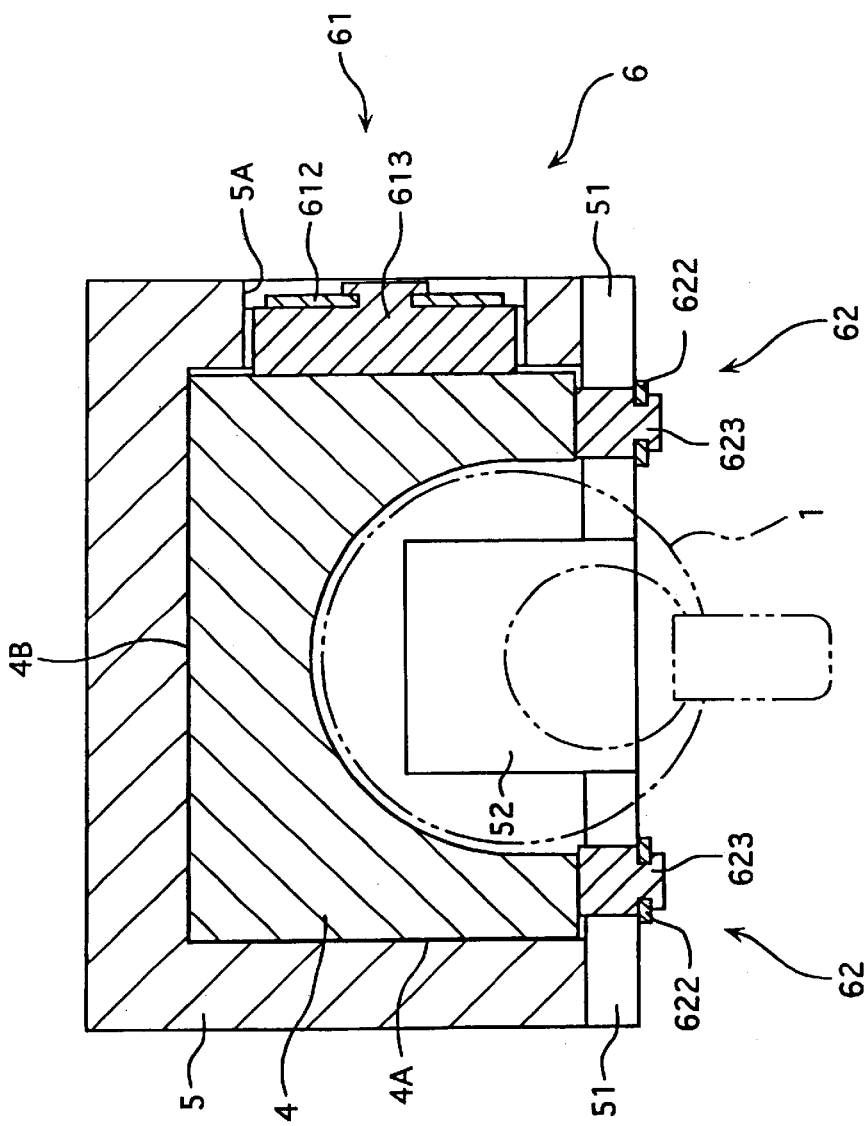
FIG. 3 is a vertical cross section of the aforesaid embodiment.

The slider 5 is formed in an approximate reverse U-shape corresponding to the shape of the guide rail 4, as shown in FIGS. 1 and 3, and is fitted to the guide rail 4 slidably in a longitudinal direction while opening downward.

The pre-load means 6 is composed of a first pre-load means 61 and a second pre-load means 62 respectively for biasing the slider 5 toward the first and the second reference surfaces 4A and 4B of the guide rail 4, as shown in FIG. 3. The first pre-load means 61 is located longitudinally at two separate positions (respectively on the front frame 33 and the rear frame 34 sides of the frame 3) on a side of the slider 5 (a side not adjacent to the first reference surface 4A of the guide rail 4). The second pre-load means 62 is located longitudinally at two separate positions on both of the lower sides of the slider 5.

Figure 4:
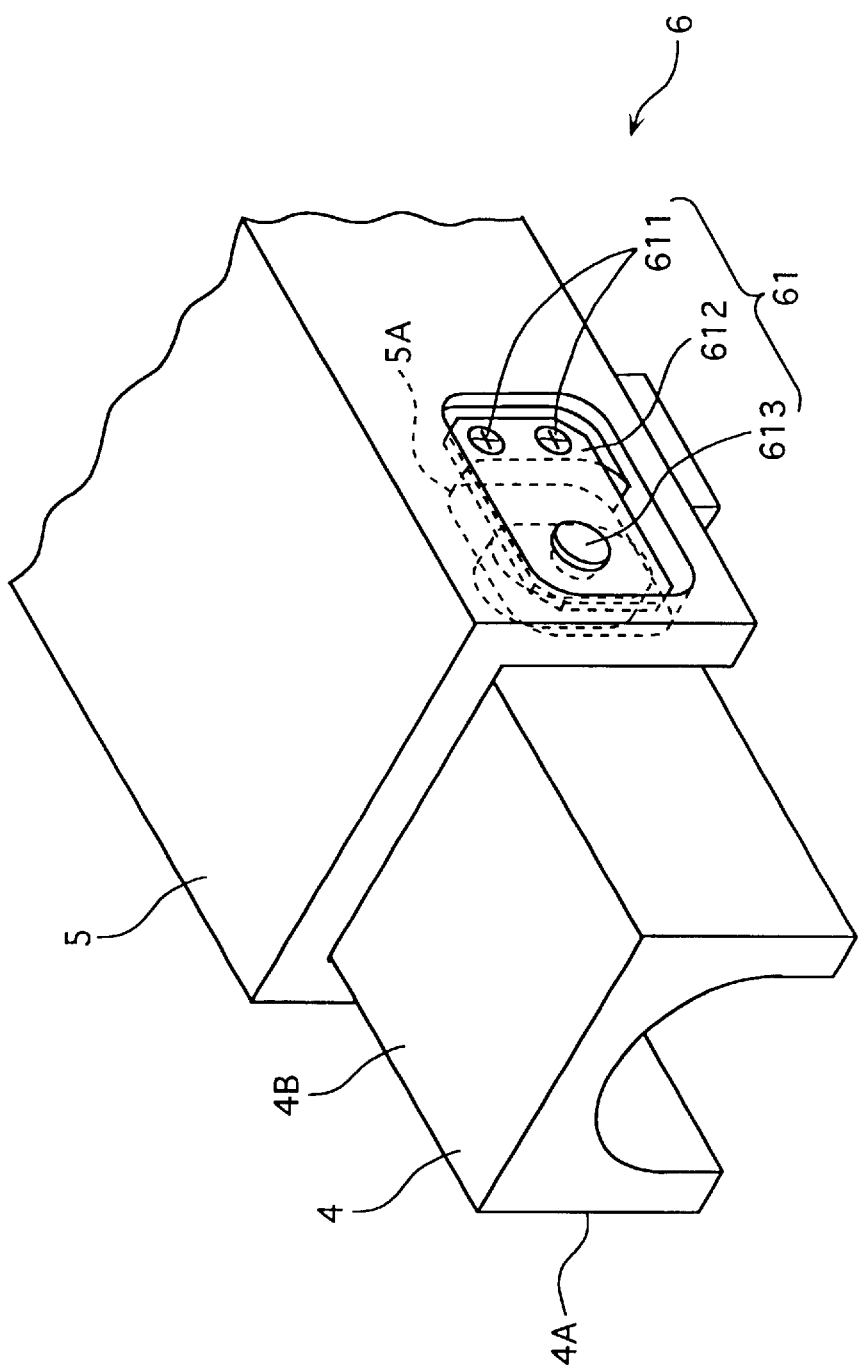
FIG. 4 is a perspective view showing a primary portion (first pre-load means) of the aforesaid embodiment.

More specifically, as shown in FIG. 4, the first pre-load means 61 has a leaf spring 612 having one end secured to a periphery of a hole 5A formed on a side of the slider 5 by screw 611, and a slide piece 613 held on the other end of the leaf spring 612 and abutted to an outer side of the guide rail 4. Since the slide piece 613 projecting toward the guide rail 4 from the hole 5A of the slider 5 is pressed to the guide rail 4 by the leaf spring 612, the slider 5 is biased to the first reference surface 4A of the guide rail 4.

The second pre-load means 62 has a first retainer block 51 provided on the lower side of the slider 5, a leaf spring 622 with one end fixed to the first retainer block 51 through a screw 621, and a slide piece 623 held to the other end of the leaf spring 622 and abutted to the lower side of the guide rail 4. Since the slide piece 623 is pressed to the guide rail 4 by the leaf spring 622, the slider 5 is biased to the second reference surface 4B of the guide rail 4.

Second retainer block 52 having a rectangular cross section extends between the first retainer blocks 51 of the second pre-load means 62 provided to the rear side (rightward in the figure) of the slider 5. Rear end (opposite side of the stylus 11) of the measuring tool 1 is attached to the second retainer block 52. In other words, the measuring tool 1 is located within the opening of the guide rail 4.

The driver 7 has a motor 71 fixed to the frame 3, a feeding threaded shaft 73 parallel to the shaft of the motor 71 and connected to the motor 71 through a connecting mechanism 72, and a feed piece 74 screwed to the feeding threaded shaft 73 and fixed to the slider. Incidentally, gear wheel, belt and chain, etc. may be connected to the connecting mechanism 72.

Next, a function of the present invention will be described below.

In measuring the surface texture of the workpiece, the drive unit holding the measuring tool is fixed to a stand (not shown) or put on a workpiece to bring the stylus 11 of the measuring tool 1 into contact with the surface of the workpiece. Subsequently, the measuring tool 1 (the stylus 11) is moved along the surface of the workpiece.

Specifically, when the motor 71 is rotated, rotating force of the motor is transmitted to the feeding threaded shaft 73 through the connecting mechanism 72. When the feeding threaded shaft 73 is rotated, the feed piece 74 screwed to the feeding threaded shaft 73 advances and retreats, so that the slider 5 and the measuring tool 1 fixed to the feed piece 74 are longitudinally moved along the guide rail 4. Since the slider 5 is moved while being in slidable contact with the first and the second reference surfaces 4A and 4B of the guide rail 4 by the respective pre-load means 61 and 62, the measuring tool 1 moves linearly without being rotated. The measuring tool 1 is thus moved along the surface of the workpiece, so that the surface roughness,etc. is detected by vertical displacement of the stylus According to the above-described embodiment, the following effects can be obtained.

In the present embodiment, the slider 5 holding the measuring tool 1 is moved without being rotated along a single guide rail 4 having the first and the second reference surfaces 4A and 4B parallel with the moving direction of the measuring tool 1, the first and the second reference surfaces 4A and 4B retaining a predetermined angle with each other. Accordingly, since the cross section of the guide rail 4 can be enlarged without increasing the size of the entire drive unit 2, the size and weight of the drive unit can be reduced while securing high rigidity as compared to a conventional arrangement having the two shafts. Therefore, the linearity of the moving direction of the slider 5 and the measuring tool 1 being moved along the first and the second reference surfaces 4A and 4B of the guide rail 4 can be achieved with high accuracy.

Further, since the slider 5 is always biased by the pre-load means 6 toward the first and the second reference surfaces 4A and 4B of the guide rail 4, the position of the slider 5 can be maintained constant even when a clearance is formed between the slider 5 and the guide rail 4. Accordingly, the position or orientation of the slider 5 (i.e. the measuring tool 1) does not become unstable on account of the clearance of the sliding portion, and the movement of the measuring tool 1 can be securely repeated.

Since the guide rail 4 and the slider 5 are formed in an approximate reverse U-shape, the weight of the guide rail 4 and the slider 5 can be reduced while maintaining high rigidity. Especially, since the corner of the opening of the guide rail 4 is rounded, the rigidity of the guide rail 4 can be further enhanced.

Since the first and the second pre-load means 61 and 62 for biasing the slider 5 to the first and the second reference surfaces 4A and 4B of the guide rail 4 are provided to the reverse U-shaped guide rail 4 and slider 5, the slider 5 can be biased toward the respective reference surfaces 4A and 4B of the guide rail 4 at an appropriate force. Further, in the present embodiment, the slider 5 is biased toward the guide rail 4 at relatively high pressure on the perpendicular first reference surface 4A and the slider 5 is biased toward the guide rail 4 at relatively low pressure on the horizontal second reference surface 4B considering gravity (weight) of the slider 5, so that the slider 5 is biased toward the respective reference surfaces 4A and 4B of the guide rail 4 at an appropriate force. Therefore, slidability and linearity of the slider 5 can be simultaneously attained.

In the pre-load means 6, since the leaf springs 612 and 622 fixed to the slider 5 presses the slide pieces 613 and 623 toward the guide rail 4 for biasing the slider 5 toward the guide rail 4, the slider 5 can be securely biased to the guide rail 4 with a simply-structured pre-load means 6.

Further, in the present embodiment, since material having small friction coefficient, such as TEFLON (trade name, i.e., polytetraflouroethylene), is used for the slide pieces 613 and 614, no great friction force is caused between the guide rail 4 and abutting surfaces of the slide pieces 613 and 623 even when the slider 5 is biased toward the guide rail 4 by the first and the second pre-load means 61 and 62, so that the slider 5 can be smoothly slid along the guide rail 4.

In the driver 7, since the shaft of the motor 71 and the feeding threaded shaft 73 are parallel, the feeding threaded shaft 73 can be extended over the maximum available longitudinal length of the drive unit 2, thus securing a longer moving distance of the measuring tool 1 than the conventional arrangement. In other words, when the moving distance of the measuring tool 1 is equal to the length of the feeding threaded shaft, the size of the drive unit 2 itself can be reduced as compared to the conventional drive unit.

The frame 3 has a front guide 31 disposed on the front side (leftward in the figure) and a rear guide 32 disposed opposite to the front guide 31, the front frame 33 and the rear frame 34 respectively attached to opposing surfaces of the front guide 31 and the rear guide 32, and the cylindrical frame cover 35 extending between the front guide 31 and the rear guide 32, both ends of the guide rail 4 being integrally fixed to the front frame 33 and the rear frame 34 of the frame 3. Accordingly, the size of the guide rail 4 can be increased relative to the size of the drive unit 2, thus further enhancing the rigidity of the entire drive unit 2. Therefore, when the drive unit 2 itself is supported by a cantilever construction, since the frame 3 and the guide rail 4 do not distort, the linearity of the moving direction of the measuring tool 1 can be maintained.

Incidentally, the scope of the present invention is not restricted to the above-described embodiment, but may include modifications and variations as long as an object of the present invention can be attained.

For instance, though the feed screw shaft 73 of the above-described embodiment is parallel with the shaft of the motor 71, the driver of the present invention is not restricted to such arrangement, but the feeding threaded shaft and the shaft of the motor may be serially disposed. Further, a brake may be provided to the driver for adjusting the moving speed of the measuring tool.

Though the pre-load means 6 of the above-described embodiment includes the leaf springs 612 and 622 and the slide pieces 613 and 623, the pre-load means 6 may be constructed by other appropriate components as long as the slider can be biased to the reference surface of the guide rail. Further, the direction for biasing the slider is not restricted to perpendicular and horizontal directions, but may be in the oblique direction.

Though the guide rail 4 and the slider 5 in the above-described embodiment are formed in an approximate reverse U-shape, the guide rail 4 and the slider 5 may be formed in a reverse V-shape with slanted upper surfaces as respective reference surfaces. In other words, the guide rail may be formed in any shape having at least two reference surfaces parallel with the moving direction of the measuring machine and arranged in a predetermined angle with each other, and the slider may be formed in any shape corresponding to the two reference surfaces of the guide rail.

What is claimed is:

1. A drive unit for moving a measuring tool along a surface of a workpiece, comprising:

a frame;

a guide rail connected to the frame, the guide rail having at least two reference surfaces in parallel with a moving direction of the measuring tool, the reference surfaces mutually crossing at a predetermined angle;

a slider slidable along the reference surfaces of the guide rail, the slider holding the measuring tool;

a pre-load means for biasing the slider toward the reference surfaces of the guide rail; and a driver for moving the slider along the guide rail.

2. The drive unit according to claim 1, wherein the guide rail is formed in an approximate reverse U-shape and the slider is formed in an approximate reverse U-shape corresponding to the configuration of the guide rail.

3. The drive unit according to claim 1, wherein the pre-load means has a first pre-load means for biasing the slider to one of the reference surfaces of the guide rail and a second pre-load means for biasing the slider to the other one of the reference surfaces of the guide rail.

4. The drive unit according to claim 1, the pre-load means comprising:

a leaf spring having one end fixed to the slider; and a slide piece being held to the other end of the leaf spring, the slide piece being abutted to the guide rail.

5. The drive unit according to claim 1, the driver comprising:

a motor;

a feeding threaded shaft provided in parallel with a shaft of the motor and connected to the motor through a connecting mechanism; and a feed piece screwed to the feeding threaded shaft and fixed to the slider.

6. The drive unit according to claim 1, wherein both ends of the guide rail are integrally fixed to both ends of the frame.

\* \* \* \* \*